United States Patent [19]

Rugraff

[11] Patent Number: 5,044,228
[45] Date of Patent: Sep. 3, 1991

[54] VEHICLE TRANSMISSIONS EQUIPPED WITH ELECTRIC RETARDERS

[75] Inventor: Guy Rugraff, Pantin, France

[73] Assignee: Labavia - S.G.E., France

[21] Appl. No.: 539,485

[22] Filed: Jun. 18, 1990

[30] Foreign Application Priority Data

Jun. 16, 1989 [FR] France ............... 89 08045

[51] Int. Cl.[5] .......... H02K 49/00; F16H 57/02; F16D 3/16
[52] U.S. Cl. .................. 74/606 R; 310/103; 310/105; 464/136
[58] Field of Search .......... 310/103, 105; 464/136; 74/606 R

[56] References Cited

U.S. PATENT DOCUMENTS

| | | | |
|---|---|---|---|
| 4,398,111 | 8/1983 | Zuch | 310/105 |
| 4,529,392 | 7/1985 | Lindenthal et al. | 464/136 X |
| 4,591,349 | 5/1986 | Lenhard Backhaus et al. | 464/136 |
| 4,683,392 | 7/1987 | MacDonald et al. | 310/105 |
| 4,791,330 | 12/1988 | Charbonnier et al. | 310/105 |
| 4,853,573 | 8/1989 | Wolcott et al. | 310/105 |
| 4,876,471 | 10/1989 | Lacour | 310/105 |
| 4,880,405 | 11/1989 | Ende | 464/136 X |
| 4,946,422 | 8/1990 | Lindenthal et al. | 464/136 X |

FOREIGN PATENT DOCUMENTS 0148170  11/1981  Japan ................. 310/105

Primary Examiner—Vinh T. Luong
Attorney, Agent, or Firm—Larson & Taylor

[57] ABSTRACT

A vehicle transmission is constructed so as to reduce as much as possible its length due to the cantilevered mounting of an electric retarder (2, 3) with two rotor discs (9a, 9b) on the casing of the gear-box (1) of this transmission. To this end, the rotor of this retarder is supported by the periphery of a gear-box flange (14) via a tubular insert (23) having at one of its ends an internal collar (24) fixed to the periphery of the flange and at its other end, an external collar (13) surrounded by the rotor rings (10).

9 Claims, 4 Drawing Sheets

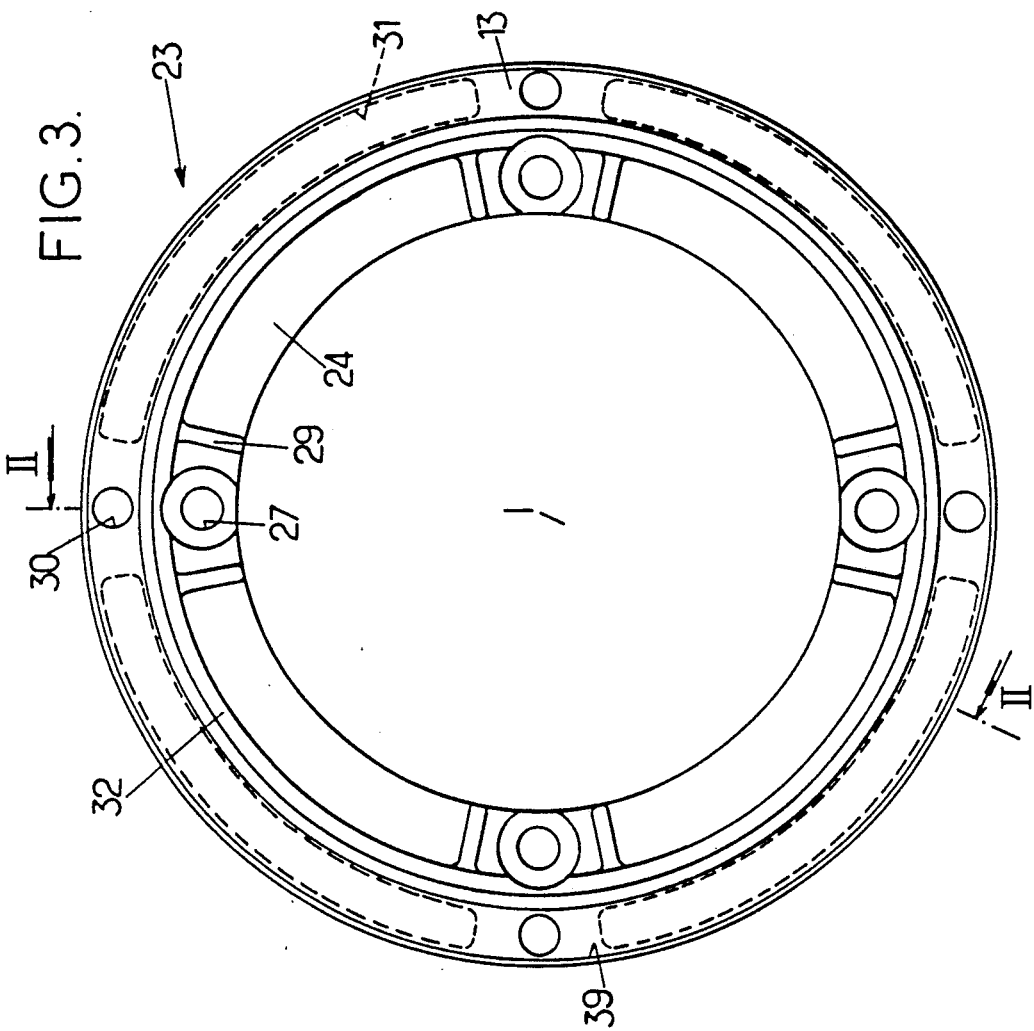
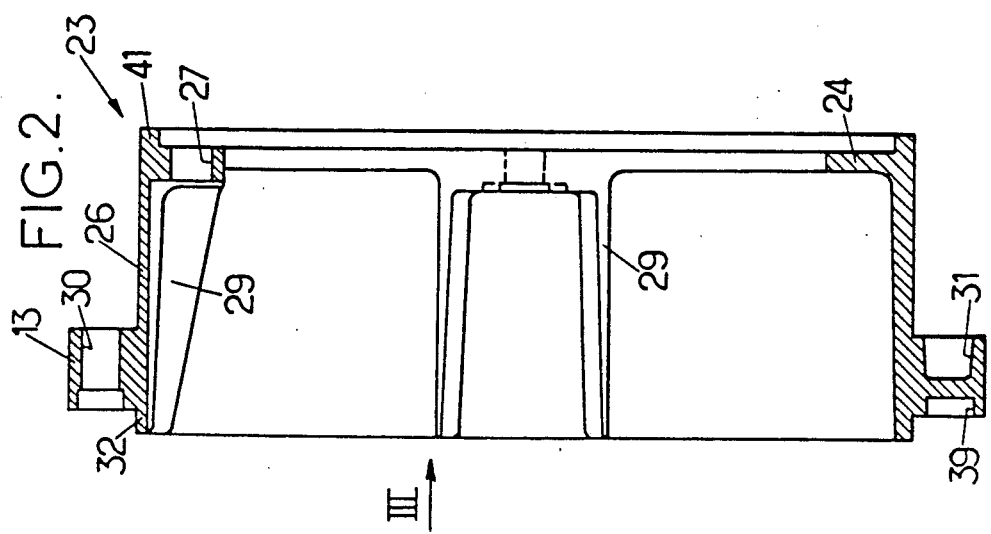

VEHICLE TRANSMISSIONS EQUIPPED WITH ELECTRIC RETARDERS

BACKGROUND OF THE INVENTION

1. Field of the Invention

The invention relates to vehicle transmissions, i.e. the series of members transmitting the rotational movement of the engine to the wheels of the vehicle, which members comprise a gear-box, a rear axle and a double cardan shaft for transferring the torque from the gear-box to the rear axle while allowing relative transverse movements thereof.

It relates more particularly, among these transmissions, to those equipped with an electric eddy current retarder exerting a braking torque thereon at desired times, the retarder being mounted directly on the casing of the gear-box of the vehicle and comprising an annular inductive stator cantilevered on the casing considered by means of an appropriate frame and a rotor comprising two induced ferromagnetic material discs which surround the stator and are both supported by a part itself cantilevered on a stub shaft inside the casing, each disc being fixed for this purpose, by means of a ring of arms forming ventilation fins, to a ring which is in its turn fixed to said part.

2. Description of the Prior Art

In known embodiments of the transmissions of the kind in question, the part on which the two rings are mounted is generally a special insert plate which is fixed both to a "gear-box flange" extending radially outwardly an end of a splined socket introduced into a "nose" of the casing of the gear-box, which socket is fixed on a stub shaft inside this nose and, on the axial side opposite this stub shaft, to an end flange of the contiguous cardan joint.

It should in fact be noted that it is not possible in practice to fit the rotor crowns directly on the gearbox flange, for the crown disposed on the gear-box side would then have to be mounted before the flange is positioned on the gear-box.

Now, such positioning is provided by tight fitting together of complementary splines formed respectively on the stub shaft inside the gear-box and the socket which the gear-box flange extends such force fitting only being able to be carried out with the flange not loaded.

It should be noted in this respect that, in the assembly according to patent FR-2 039 556, the flange on which the rotor crowns are mounted is not comparable with the above defined "gear-box flange": in fact, in this 10 prior assembly, the socket which is extended by the flange is not introduced into a "nose" of the casing, but in a sleeve forming part of the stator of the retarder, to which stator the rotor is pre-assembled in the factory with interpositioning of a bearing.

When such a retarder is mounted on the "nose" of a gear-box, the axial length of the socket is added to that of the "nose", which results in a great length between the gear-box and the flange, which length is incompatible with the objects pursued by the present invention which will be explained hereafter.

In so far as the above mentioned special insert plate is concerned, it must have a certain thickness since it must be able to transmit the whole of the drive torque of the vehicle from the cardan to the gear-box flange.

Thus, it has the double drawback of relatively high weight and axial dimension.

The last drawback may be serious in the case of very short transmissions, i.e. in which a limited space is available between the output of the gear-box and the input of the rear axle.

This is in particular the case for certain modern buses or coaches with rear engine, in which the overall length of the engine/gear-box assembly and that of the rear axle, particularly of hypoid type, increase without the respective positions of these members being modified.

In such a case, it may be vital to reduce the extension of the transmission due to the fitting of an electric retarder of the above kind thereon by a few centimeters, the possibility of adopting such a retarder being sometimes directly related to such a reduction.

SUMMARY OF THE INVENTION

The object of the invention is especially to make a substantial reduction of the indicated extension possible, i.e. to shorten the axial distance D between the front plane of the gear-box and the center of the nearest cardan, which shortening may reach 120 and even 150 mm with respect to known constructions for a retarder having a diameter of about 500 mm, the axial distance D being possibly reduced to less than 200 mm and for example to 170 mm only.

For this, the transmissions of the kind in question according to the invention are essentially characterized in that the gear-box flange is provided with two rings of fixing elements, the first of which serves for fixing the contiguous cardan joint and a tubular insert is provided extending axially from the periphery of the gear-box flange on the side opposite the gear-box and extended at one of its ends by an internal, continuous or discontinuous, collar applied jointingly in an axial direction against the periphery of the face of the gearbox flange the furthest away from the gear-box, which collar is formed with a ring of fixing holes cooperating with the elements of the second ring of the gear-box flange and at its other axial end by an external collar formed with a ring of holes for fixing the rings of the rotor crowns.

In the preferred embodiments, recourse is had to one and/or other of the following arrangements :

- the tubular insert is extended, on the gear-box flange side, by a cylindrical edge jointingly covering this flange,
- the tubular insert the gear-box flange, in a cylindrical extension forming an internal guide surface for the ring of the rotor crown the furthest away from the gear-box,
- the external lateral face of the median portion of the tubular insert forms an internal guide surface for the ring of the rotor crown the closest to the gear-box,
- the internal collar is formed of four perforated lugs,
- in a transmission according to the preceding paragraph, the gear-box flange has the general form of a cup open towards the contiguous cardan joint, the first ring of fixing elements comprises four threaded holes formed respectively in the arms of two parallel forks bordering the cup and intended to receive two journals of the journal cross of the cardan joint and the second ring of fixing elements comprises four threaded holes formed in the two ends of the portions of the edge of the cup which connect the two forks together, which portions are set back axially with respect to these forks and which are hollowed radially in their median zones so as to allow free movement of the cardan joint about the axis of the tow above journals, the gear-box flange is enlarged transversely and the first ring of fixing elements has a smaller diameter than the second, in a transmission according to the preceding paragraph, the radial thickness of the cylindrical portion of the tubular insert is substantially constant over the whole of its extent and this portion is reinforced on the inside by radial ribs whose height decreases from the internal collar to the opposite axial end, the ribs according to the preceding paragraph are located close to the fixing holes formed in the internal collar, at the rate of two such ribs surrounding each hole.

Apart from these main arrangements, the invention comprises certain other arrangements which are preferably used at the same time and which will be more explicitly discussed hereafter.

BRIEF DESCRIPTION OF THE DRAWINGS

In what follows, two embodiments of the invention will be described with reference to the accompanying drawings in a way which is of course in no wise limitative.

FIGS. 2 and 3 show on a larger scale, respectively in axial section through II—II of FIG. 3 and an end view along the arrow III of FIG. 2, a tubular insert forming part of the above transmission, which insert is formed in accordance with the invention.

DESCRIPTION OF THE PREFERRED EMBODIMENTS

Figure 1:
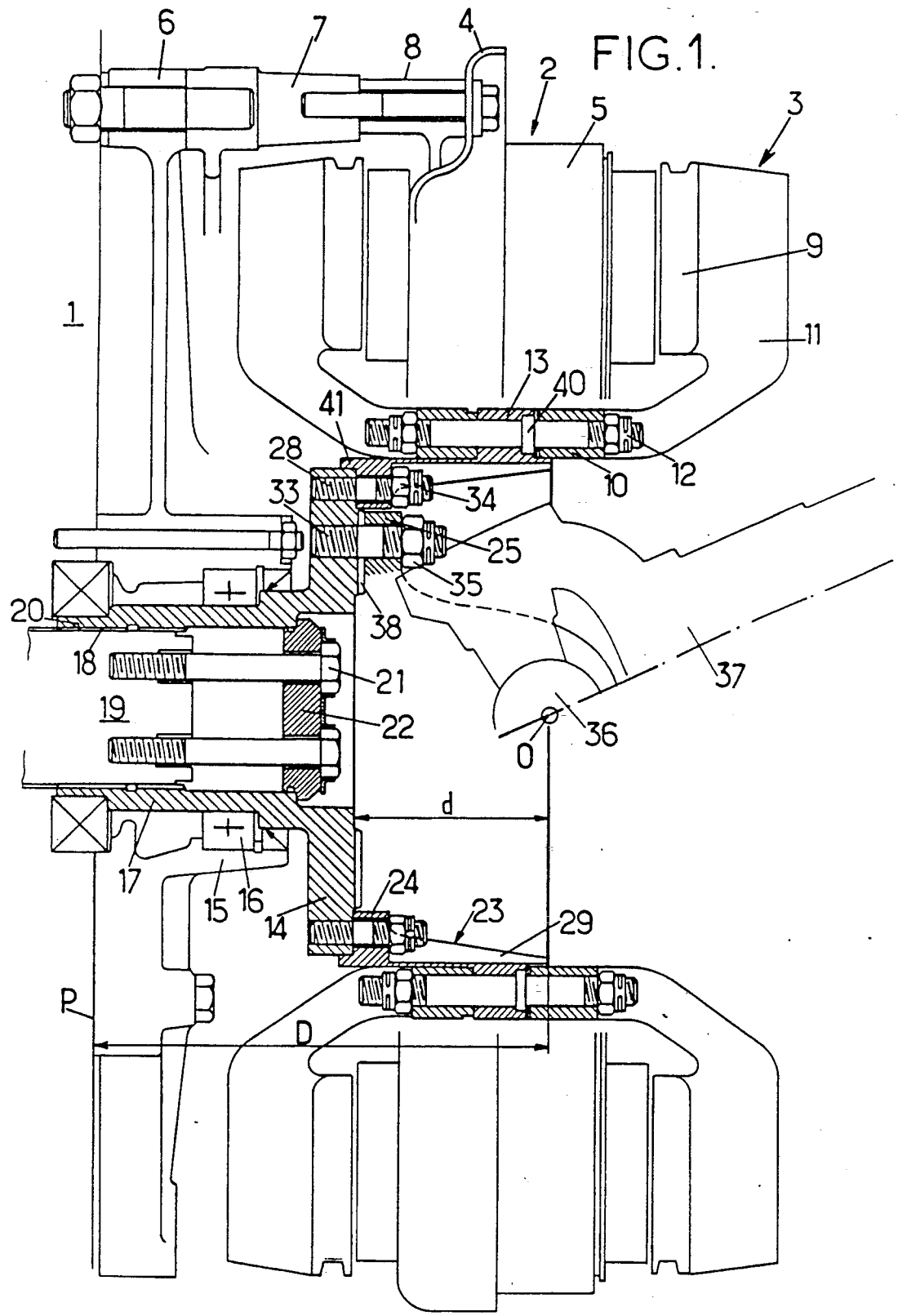
FIG. 1 of these drawings shows in axial section a part of a vehicle transmission, which part is equipped with an electric retarder in accordance with the invention.

In each case, the electric retarder considered is of the type known under the trademark "FOCAL" mounted, with a horizontal or substantially horizontal axis, cantilever fashion on the output of a gear-box casing 1. This retarder comprises an inductor stator 2 and an induced rotor 3.

Stator 2 comprises a substantially annular flange 4 which carries a ring of coils 5, even in number, arranged so as to form by their ends two annular series of flat magnetic poles with alternate polarities from one to the next.

Flange 4 is mounted on the gear-box casing 1—or more precisely on an intermediate mount 6 itself fixed against the front flat face of said casing 1—by means of a structure 7 in the form of a star or apertured bell and tubular spacers 8. Rotor 3 comprises two ferromagnetic material discs 9a and 9b adapted to surround the stator axially and to travel each in front of a succession of poles of this stator from which they are separated by a small clearance or airgap e.

Each disc 9a and 9b is connected to a fixing ring 10a and 10b by a ring of curved arms 11a and 11b forming ventilation fins and the two rings 10a and 10b are bolted by bolt-nut systems 12a and 12b to an intermediate annulus 13 which will be discussed further on.

The problem to be solved is the fitting of this annulus 13 to a "gear-box flange" 14 defined as follows.

The central portion of the gear-box mount 6 has the form of a cylindrical nose 15 carrying, via an end bearing 16, a sleeve 17 whose external axial end is extended radially by the flange 14, called in the present text "gear-box flange".

The other axial end of sleeve 17 is splined inwardly at 18 and is force fitted on the end piece 19 of the gear-box, which is splined externally at 20.

Such fitting is achieved by force to prevent any creation of play and it is then held in position by screwing axially into end piece 19 bolts 21 whose heads are applied against a plate 22 itself bearing on sleeve 17.

As mentioned above, it is proposed to mount the annulus 13 on the gear-box flange 14. To shorten the transmission as much as possible because of the above mentioned requirements, the axial lengths of nose 15 and of sleeve 17 are relatively small and flange 14 extends close to the axial end of said nose 15.

For this reason, and since the two rotor crowns 9-12 are identical and so have the same dimensions, there would not be sufficient room in the annular hollow of structure 7 to house therein the crown the closest to the gear-box if the annulus merged with the periphery of flange 14.

Another reason why such a solution cannot be envisaged resides in the requirements of force fitting since, as mentioned above, it would then be necessary to fit the internal rotor crown on the flange before this flange was fitted to the gear-box.

In order to overcome these difficulties, an insert plate is provided which is fixed externally on the gear-box flange 14, the periphery of this insert plate then forming the annulus 13.

To eliminate the need for this particularly heavy and cumbersome insert plate, in accordance with the invention, annulus 13 is formed by one end, projecting radially outwards, of a tubular insert 23 having in axial cross section the form of a stretched Z and the other end 24 of this insert 23 projecting radially inwards in the form of a continuous or discontinuous collar is fixed to the periphery of the face of the gear-box flange 14 the furthest away from the gear-box.

Use of this tubular insert 23 brings simultaneously the following advantages:

annulus 13 remains independent of the gear-box flange 14 during the first assembly phases, which allows sleeve 17 ending in said flange 14 to be force fitted without difficulty on the splined end of end-piece 19, the usual insert plate is omitted, which makes it possible to fix a component part 25 of the contiguous cardan joint 36 directly against the gear-box flange 14, thus reducing the transmission correspondingly, annulus 13 is moved axially away from gear-box 1, which makes it possible to house the rotor crown the closest to the gear-box in the annular hollow of structure 7, the tubular insert 23 may be further extremely light: 35 in fact this insert has no longer to transmit the drive torques of the vehicle, but only those of the retarder, the largest of which have a value generally ten times less than the maximum drive torques; this part may be given a relatively small section, be ribbed and thickened locally in its most stressed portions, even thinned locally if necessary, the housing in the form of a pot defined by the assembly of the gear-box flange 14 and the tubular insert 23 has a relatively large diameter, which makes possible relatively large free angular movement for the cardan shaft fixed to said gear-box flange.

Concerning this latter advantage, it should be noted that the assembly proposed here is particularly advantageous when the inner diameter of the tubular insert 23 is large, which presupposes large diameters for annulus 13, rings 10 and so for the orifice formed inside the crown of stator poles 5 this latter condition is in particular fulfilled by giving to the even number of these poles a value greater than 8, for example equal to 10, as taught by the patent FRANCE 2 577 357.

The first embodiment which is illustrated in FIGS. 1 to 3 corresponds to such a case where the internal diameter of the tubular insert may be relatively large.

In this case, flange 14 has the general form of a flat disc, its diameter is enlarged with respect to the usual embodiment and it is on the enlarged periphery of this flange that collar 24 is fixed.

The tubular insert 23 comprises a central tubular portion 26 having a constant radial thickness over the whole of its extent and connected in the vicinity of one of its axial ends to an external collar forming annulus 13 and at its other axial end to the internal collar 24.

The largest diameter portion of internal collar 24 is extended axially by a cylindrical edge 41 adapted to cover the periphery of the gear-box flange 14 jointingly, which facilitates assembly and mutual centering of these two parts.

Said internal collar 24 is formed with fixing holes 27 to be aligned with fixing stud-bolts 28 set in the periphery of the gear-box flange 14 and for example four in number.

The tubular portion 26 is reinforced on the inside by radial ribs 29 which are for example located in the vicinity of holes 27 at the rate of two ribs 29 surrounding each hole.

The radial height of these ribs decreases from the internal collar 24 as far as the opposite axial end of the insert, which gives each rib a general triangular shape.

This shape is both that which leads to better stiffening of the tubular insert for a given weight of metal and which makes possible the largest angular movements for the cardan shafts 37 as shown in FIG. 1.

The material forming the insert is advantageously a nodular cast metal of noble quality or else an ordinary die cast steel.

As can be seen in FIG. 1, the threaded ends of stud-bolts 28 and 33 set in the gear-box flange 14 and serving respectively for assembling on said gear-box flange the tubular insert 23 and part 25 forming the cardan joint—which part is here the end flange of this joint—are both readily accessible for fitting the fixing nuts 34 and 35 thereon. With such a construction, it is easy to fit the gear-box flange 14 and to remove independently of each other the double cardan shaft 37 and the rotor 3 of the retarder.

The external collar 13 is also formed with fixing holes 30, for example four in number, for receiving the bolt-nut systems 12. This external collar 13 is formed axially, in one of its transverse faces, with a continuous groove 39 whose edges form angular stops for squares 40 belonging to the bolt-nut systems 12, and the portions of the other transverse face of said collar 13, situated between holes 30, are formed with grooves 31 along arcs of a circle.

The base of the external collar 13 is extended, on its face the furthest away from gear-box 1, by a cylindrical edge 32 forming an internal guide surface for ring 10 of the rotor crown the furthest away from gear-box 1.

Similarly, the external face of the central portion 26 of the tubular insert forms an internal guide surface for ring 10 of the other rotor crown.

As can be seen in FIG. 2, the portions of the internal collar 24 which surround holes 27 are thickened slightly axially.

In FIG. 1 at 38 can be further seen teeth provided respectively on the facing faces of the gear-box flange 14 and the cardan flange 25 and serving for transferring the drive torques between these two flanges.

In the second embodiment illustrated in FIGS. 4 to 6, we find again most of the elements of the preceding embodiment, which bear the same reference numbers as before.

This second embodiment differs essentially from the first one in that the gear-box flange 14 is not specially enlarged therein.

In fact, the cardan joint 36 to be connected to said flange has here a very small transverse dimension, this joint no longer comprising the preceding end flange 25 which formed a block, in a way known per se, with a pair of half jaws adapted for receiving two of the journals forming the journal cross of the joint considered.

Here, this end flange merges with the gear-box flange 14.

This gear-box flange is in the general form of a cup open towards the cardan joint 36 and bordered by two parallel forks 42 forming the two above half jaws, i.e., intended to receive two journals of the journal cross 43 of joint 36, which forks are each formed with two threaded holes 44.

The part 25 of the cardan joint which is fixed to the gear-box flange 14 is here formed by two bridges or jaw complements intended to form with forks 42 the bearings for receiving the above journals while being fixed to these forks by means of screws 45, which are screwed into holes 44 after passing through appropriate holes 46 formed in said bridges 25.

The edge of the cup forming flange 14 is completed by two curved sections 47 disposed axially and set back with respect to forks 42 and each bordered at their two circumferential ends by two internal bosses 48 formed with threaded holes 49.

The internal collar 24 which the tubular insert 23 comprises is here discontinuous and is formed by four lugs pierced with holes 27.

These holes 27 are intended to be aligned with the threaded holes 49 for fixing lugs 24 connected to the tubular insert on bosses 48 by means of screws 50 screwed into said holes 49 after passing through said holes 27.

Figure 4:
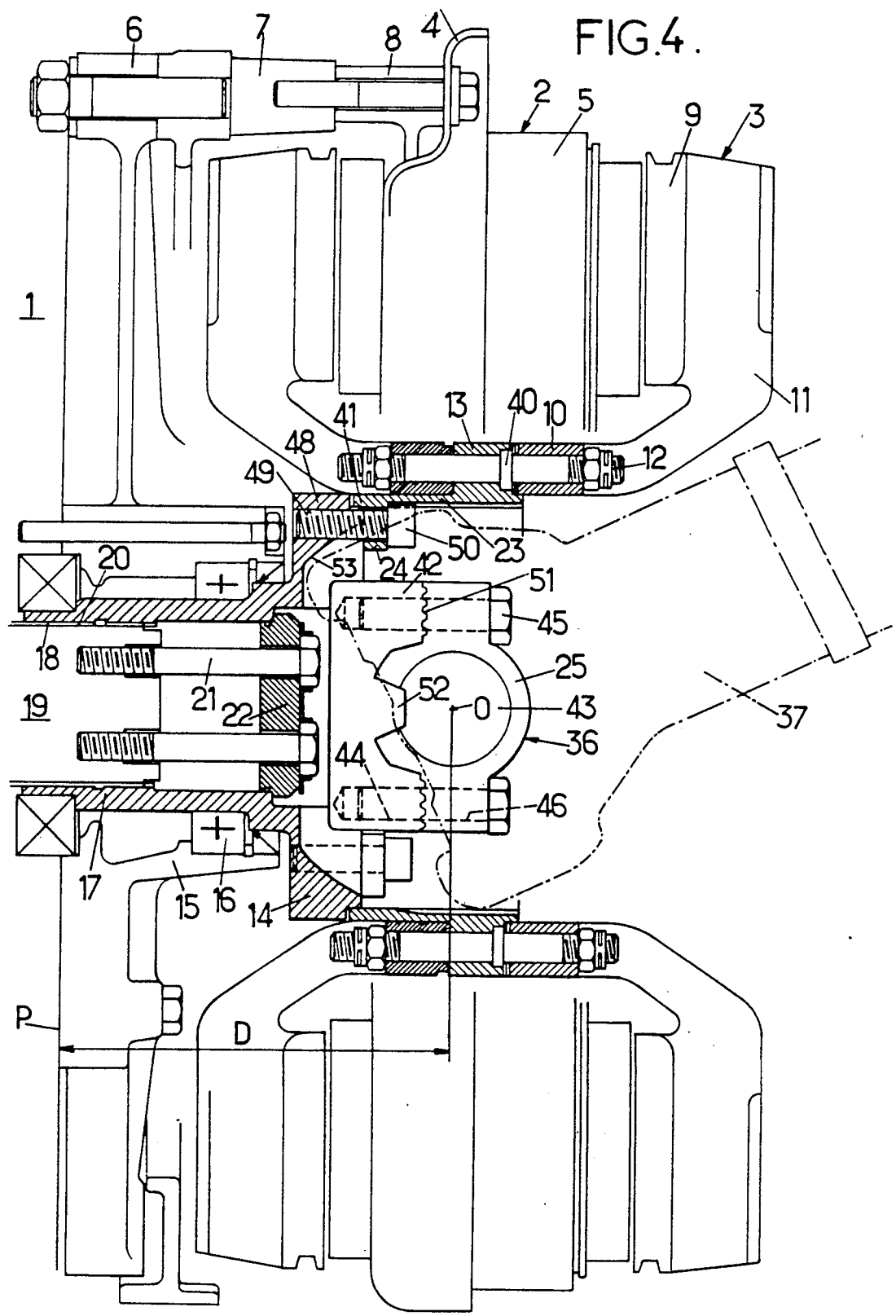
FIG. 4 shows similarly to FIG. 1 a variant also in accordance with the invention of the transmission portion shown in FIG. 1, FIGS. 5 and 6 show on a larger scale and in an end view, respectively, the gear-box flange of the transmission according to FIG. 4 and half of the tubular insert of this transmission.
Figure 5:
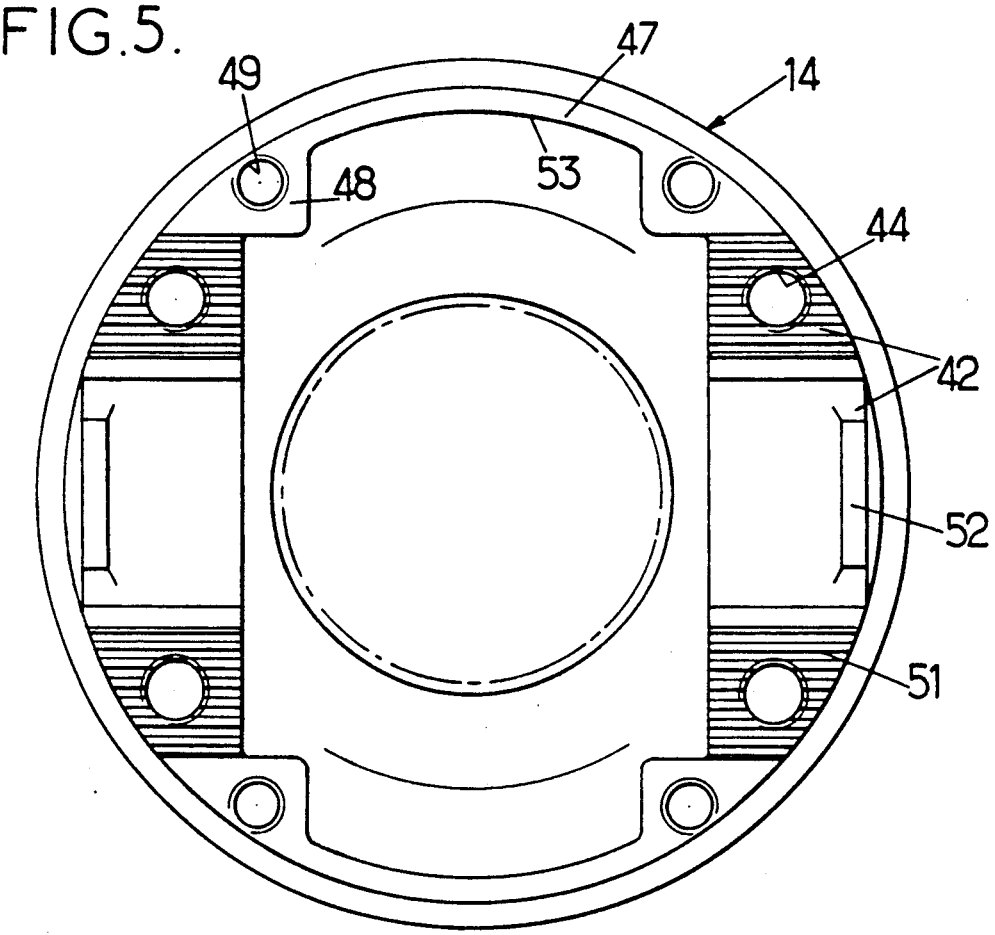
Figure 6:
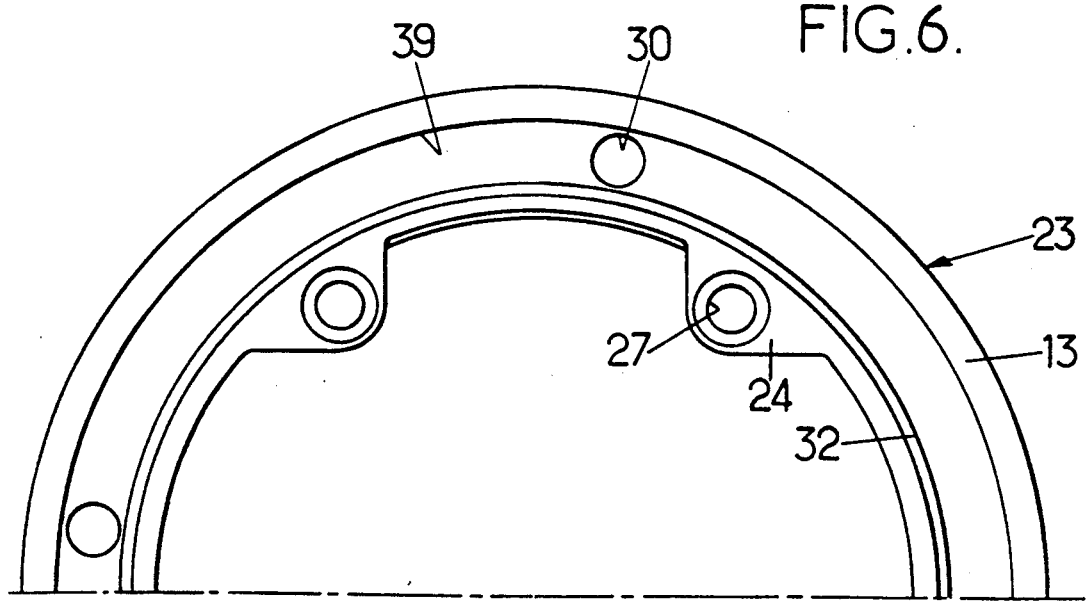

In FIGS. 4 and 5 can be further seen:

at 51, complementary teeth provided on the facing surfaces of parts 25 and forks 42 for ensuring good transfer of the drive torques between the respectively meshing parts;

at 52, stops integral with forks 42 for limiting certain movements of journal 43; and at 53 hollows which are formed radially in the two curved sections 47, of a small axial height, bordering locally the cup 24 so as to make angular movements of large amplitude of cardan joint 36 possible about the axis common to the two journals received in forks 42.

Purely by way of illustration and in no wise limitative, some sizes relative to the embodiments in accordance with the drawings are indicated, which have given every satisfaction:

distance D between the front plane P by which mount 6 is applied on gear-box 1 and the center 0 of the cardan joint 36 the closest to the gear-box : between 170 and 205 mm, axial overall length of the tubular insert 23 : between 70 and 95 mm for inner diameters of the cylindrical portion thereof respectively between 175 and 225 mm.

Following which, and whatever the embodiment adopted, an extremely short vehicle transmission is finally obtained although it is equipped with an electric retarder of the "FOCAL" type.

As is evident, and as it follows moreover already from what has gone before, the invention is in no wise limited to those of is modes of application and embodiments which have been more especially envisaged; it embraces, on the contrary, all variants thereof.

I claim:

1. Vehicle transmission comprising a gear-box including a casing, a cardan joint including a shaft and journal cross, and an electric eddy current retarder mounted directly on the casing of the gear-box and comprising an annular inductive stator cantilevered on said casing by means of a frame and a rotor comprising two induced ferromagnetic material discs which surround the stator and which are both supported by a gear-box flange itself cantilevered on a stub shaft inside the casing, each disc being affixed, by means of a ring of arms forming ventilation fins, to a rotor ring secured to said gear-box flange, said gear-box flange including first and second rings of fixing elements, the first ring of fixing elements serving to connect the flange to the cardan joint, said transmission further comprising a tubular insert extending axially away from the periphery of the gear-box flange on the side thereof opposite the gear-box, said insert including an internal collar joined in axial engagement against the periphery of the face of the gear-box flange furthest away from the gear-box, said collar including at one axial end thereof a ring of fixing holes which receive the fixing elements of the second ring of the gear-box flange and including at the other axial end thereof an external collar having formed therein a ring of holes for fixing the rotor rings to said gear-box flange.

2. Vehicle transmission according to claim 1, wherein the tubular insert includes a second cylindrical edge extending outwardly therefrom for engaging and covering a peripheral edge of said gear-box flange.

3. Vehicle transmission according to claim 1, wherein the tubular insert terminates, at the axial end thereof opposite the gear-box flange, in a cylindrical extension forming an internal guide surface for the rotor ring disposed furthest away from the gear-box.

4. Vehicle transmission according to claim 1, wherein an external lateral face of a median portion of the tubular insert forms an internal guide surface for the rotor ring disposed closest to the gear-box.

5. Vehicle transmission according to claim 1, wherein said internal collar comprises four perforated lugs.

6. Vehicle transmission according to claim 5, wherein the gear-box flange has the general shape of a cup open towards the cardan joint, wherein the first ring of fixing elements comprises four threaded holes which are formed respectively in the arms of two parallel forks disposed adjacent to the cup shaped gear-box flange and which receive two journals of the journal cross of the cardan joint and wherein the second ring of fixing elements comprises four threaded holes formed in to ends of portions of the edge of the cup shaped gear-box flange which connect the two forks together, said portions being set back axially with respect to said two forks and being hollowed radially in median zones thereof so as to allow free movement of the cardan joint about the axis of said two journals.

7. Vehicle transmission according to claim 1, wherein the gear-box flange is enlarged transversely of the longitudinal axis thereof and wherein the first ring of fixing elements has a smaller diameter than the second ring of fixing elements.

8. Vehicle transmission according to claim 7, wherein the radial thickness of the cylindrical portion of the tubular insert is substantially constant over the entire extent thereof and wherein said cylindrical portion is reinforced on the inside by radial ribs the height of which decreases from the internal collar to the opposite axial end of the cylindrical portion.

9. Vehicle transmission according to claim 8, wherein the ribs are located close to the fixing holes of the internal collar, with said ribs surrounding each hole.

* * * * *